United States Patent [19]

Cobb et al.

[11] Patent Number: 5,119,377
[45] Date of Patent: Jun. 2, 1992

[54] SYSTEM AND METHOD FOR SOFTWARE ERROR EARLY DETECTION AND DATA CAPTURE

[75] Inventors: Paul R. Cobb, Raleigh; Christopher J. Lennon; Kenneth J. Long, both of Cary, all of N.C.

[73] Assignee: International Business Machines Corporation, Armonk, N.Y.

[21] Appl. No.: 367,403

[22] Filed: Jun. 16, 1989

[51] Int. Cl.[5] .................. G06F 11/00; G01R 31/28
[52] U.S. Cl. ................................ 371/19; 371/16.1; 371/29.1
[58] Field of Search ............... 371/12, 16.1, 19, 29.1, 371/21.6; 364/267.8, 267.91

[56] References Cited

U.S. PATENT DOCUMENTS

| | | | |
|---|---|---|---|
| 3,551,659 | 12/1970 | Forsythe | 340/172.5 |
| 3,664,569 | 9/1989 | DeLucia et al. | 371/19 |
| 3,937,938 | 2/1976 | Matthews | 371/19 |
| 4,514,846 | 4/1985 | Federico et al. | 371/16.5 |
| 4,696,003 | 9/1987 | Kerr et al. | 371/69.1 |
| 4,703,482 | 10/1987 | Auger et al. | 371/16.1 |
| 4,755,997 | 7/1988 | Takahashi | 371/19 |
| 4,802,165 | 1/1989 | Ream | 371/19 |
| 4,819,232 | 4/1989 | Krings | 364/200 |
| 4,965,772 | 10/1990 | Daniel et al. | 364/900 |

Primary Examiner—Jerry Smith
Assistant Examiner—Ly V. Hua
Attorney, Agent, or Firm—John J. Timar

[57] ABSTRACT

A process for detecting software errors in a computer program and automatically gathering diagnostic data limited to the error to be resolved. Error detection code is placed within the software program during program development. When an error or failure is detected, this process is called and captures only the data required to debug the software error. The error detection code notifies the process of which data to capture by selecting entries from a table within the process. This table, known as an Application Data Table (ADT), contains the layout and format of all data areas used by the calling problem program and information required to build a generic alert and send the generic alert to a computer network monitor program. This process is only called conditionally when an error is detected. It is completely idle until such a condition occurs.

15 Claims, 9 Drawing Sheets

FIG. 2

| OFFSET | LENGTH | DESCRIPTION |
|---|---|---|
| 00 | 8 | PROBLEM PROGRAM NAME |
| 08 | 8 | PROBLEM PROGRAM VERSION OR RELEASE LEVEL |
| 10 | 8 | PROBLEM PROGRAM SERVICE LEVEL |

FIG. 3

| OFFSET | LENGTH | DESCRIPTION |
|---|---|---|
| 01 | 2 | OFFSET INTO THE DATA STRUCTURE WHERE ITS LENGTH VALUE IS LOCATED. |
| 03 | 2 | LOCATION OF THE ADDRESS, IN THIS STRUCTURE, FOR THE NEXT STRUCTURE IN A CHAIN (IF THIS IS A CHAINED STRUCTURE) |
| 05 | 2 | LOCATION OF STOP IDENTIFIER (IF THIS IS A CHAINED STRUCTURE) |
| 07 | 2 | LOCATION OF CONTROL BLOCK/DATA STRUCTURE IDENTIFIER |
| 09 | 4 | STOP IDENTIFIER (IF CHAINED) |
| 13 | 4 | CONTROL BLOCK/DATA STRUCTURE IDENTIFIER |
| 17 | * | CONTROL BLOCK/DATA STRUCTURE TITLE |

FIG. 4

| OFFSET | LENGTH | DESCRIPTION |
|---|---|---|
| 00 | 1 | CATEGORY OF ERROR (E.G., TEMPORARY, PERMANENT) |
| 01 | 2 | GENERIC ALERT DESCRIPTION CODE POINT |
| 03 | 1 | NUMBER OF GENERIC ALERT PROBABLE CAUSES CODE POINTS INCLUDED IN THIS TABLE ENTRY |
| 04 | x | GENERIC ALERT PROBABLE CAUSES CODE POINTS |

FIG. 5

| OFFSET | LENGTH | DESCRIPTION |
|---|---|---|
| 00 | 1 | CATEGORY OF ERROR CAUSE (E.G., USER, DEFECT, INSTALL, OR UNDETERMINED) |
| 01 | 2 | GENERIC ALERT CAUSE CODE POINT |
| 03 | 1 | NUMBER OF TEXT INSERTIONS |
| 04 | 1 | LENGTH OF TEXT INSERTION DATA |
| 05 | x | TEXT INSERTION DATA |
| ... | ... | ... |
| x+y | 1 | LENGTH OF TEXT INSERTION DATA |
| x+y+1 | z | TEXT INSERTION DATA |

FIG. 6

| OFFSET | LENGTH | DESCRIPTION |
|---|---|---|
| 00 | 1 | GENERIC ALERT RECOMMENDED ACTION CODE POINT |
| 01 | 1 | NUMBER OF TEXT INSERTIONS |
| 02 | 1 | LENGTH OF TEXT INSERTION DATA |
| 03 | x | TEXT INSERTION DATA |
| ⋮ | ⋮ | |
| x+y | 1 | LENGTH OF TEXT INSERTION DATA |
| x+y+1 | z | TEXT INSERTION DATA |

FIG. 8A

SECTION 1: ENVIORNMENT DATA

| OFFSET | LENGTH | TYPE | DESCRIPTION |
|---|---|---|---|
| X '00' | 2 | CHAR | SYMPTON RECORD ID ('SR') |
| X '02' | 4 | CHAR | MACHINE TYPE |
| X '06' | 6 | CHAR | MACHINE SERIAL NUMBER |
| X '0C' | 8 | INT | RESERVED AND SET TO ZEROS |
| X '14' | 8 | CHAR | TIME STAMP (HHMMSSTH) |
| X '1C' | 6 | CHAR | DATE (YYMMDD) |
| X '22' | 8 | CHAR | NAME OF SYSTEM OR PROCESSOR |
| X '2A' | 4 | CHAR | PRODUCT ID OF OPERATING SYSTEM |
| X '2E' | A | INT | RESERVED AND SET TO ZEROS |
| X '38' | 8 | CHAR | DUMP FILE NAME |

SECTION 2: RECORD POINTERS

| OFFSET (FROM END OF SECT. 1) | LENGTH | TYPE | DESCRIPTION |
|---|---|---|---|
| X '00' | 2 | CHAR | ARCH. LEVEL ('01') |
| X '02' | 2 | INT | LENGTH OF SECTION 2 |
| X '04' | 2 | INT | LENGTH OF SECTION 2.1 |
| X '06' | 2 | INT | OFFSET OF SECTION 2.1 |
| X '08' | 2 | INT | LENGTH OF SECTION 3 |
| X '0A' | 2 | INT | OFFSET OF SECTION 3 |
| X '0C' | 2 | INT | LENGTH OF SECTION 4 |
| X '0E' | 2 | INT | OFFSET OF SECTION 4 |
| X '10' | 8 | INT | LENGTH OF SECTION 5 |
| X '18' | 18 | INT | RESERVED AND SET TO ZERO |

FIG. 8B

SECTION 2.1: SOFTWARE ID OF DETECTING COMPONENT

| OFFSET (FROM END OF SECT.2) | LENGTH | TYPE | DESCRIPTION |
|---|---|---|---|
| X '00' | 4 | CHAR | SECTION ID ('SR21') |
| X '04' | 2 | CHAR | ARCH. LEVEL ID ('10') |
| X '06' | 9 | CHAR | PROGRAM NUMBER |
| X '0F' | 1 | INT | RESERVED AND SET TO ZERO |
| X '10' | 4 | CHAR | PROGRAM VERSION OR RELEASE NUMBER |
| X '14' | 8 | CHAR | PROGRAM SERVICE LEVEL |
| X '1C' | 10 | INT | RESERVED AND SET ZERO |
| X '2C' | 20 | CHAR | TEXT DESCRIPTION |
| X '4C' | 4 | INT | ERROR LOG RETURN CODE |
| X '50' | 4 | INT | ERROR LOG REASON CODE |
| X '58' | 8 | CHAR | NUMBER ASSIGNED TO PROBLEM |
| X '60' | 8 | CHAR | COMPONENT OR MODULE NAME |

SECTION 3: PRIMARY SYMPTON STRING

| OFFSET (FROM END OF SECT.2.1) | LENGTH | TYPE | DESCRIPTION |
|---|---|---|---|
| X '00' | 80 | CHAR | PRIMARY SYMPTON STRING |

SECTION 4: SECONDARY SYMPTON STRING

| OFFSET (FROM END OF SECT.2.1) | LENGTH | TYPE | DESCRIPTION |
|---|---|---|---|
| X '00' | 80 | CHAR | SECONDARY SYMPTON STRING |

FIG. 9

| ADT ENTRY TYPE | ADT ENTRY OFFSET | SUBVECTOR | SUBFIELD | OFFSET | DESCRIPTION |
|---|---|---|---|---|---|
| APPL. DATA STRUCTURE ENTITY | 00 | X '92' | N/A | 04 | ALERT TYPE |
| APPL. DATA STRUCTURE ENTITY | 01 | X '92' | N/A | 05-06 | ALERT DESCRIPT. |
| APPL. DATA STRUCTURE ENTITY | 04 | X '93' | N/A | 02-P | PROBABLE CAUSES CODE POINTS |
| GENERIC ALERT CAUSES | 02 | X '94' | X '01' | 02-Q | USER CAUSES CODE POINTS |
| GENERIC ALERT CAUSES | 02 | X '95' | X '01' | 02-Q | INSTALL CAUSES CODE POINTS |
| GENERIC ALERT CAUSES | 02 | X '96' | X '01' | 02-Q | FAILURE CAUSES CODE POINTS |
| GENERIC ALERT CAUSES | 01 | X '97' | N/A | N/A | UNDETERMINED CAUSE |
| GENERIC ALERT RECOMMND ACTIONS | 01 | X '94' X '95' X '96' X '97' | X '81' | 02-Q | RECOMMENDED ACTION CODE POINTS |

SYSTEM AND METHOD FOR SOFTWARE ERROR EARLY DETECTION AND DATA CAPTURE

REFERENCE TO RELATED APPLICATIONS

This application is related to the following co-pending applications having the same assignee. Patent application Ser. No. 261,212 by M. C. Rhodes et al, filed Oct. 24, 1988, entitled, "Intra-System Program to Program Communication Facility," discloses a cross memory data transport facility that provides a high level, easy-to-use interface by which a user program can send a copy of a data buffer to another user program. The user programs can be executing in the same or different address spaces. Patent application Ser. No. 063,618 now U.S. Pat. No. 4,965,772 by A. A. Daniel et al, filed Jun. 15, 1987 entitled, "Method and Apparatus for Communications Network Alert Message Construction," discloses an event notification device for a computer network in which bit strings referred to as code points are used to index predefined tables containing brief text messages used in building an operator's information display.

BACKGROUND OF THE INVENTION

Historically, most software has been designed under the assumption that it will never fail. Software has little or no error detection capability designed into it. When a software error or failure does occur, it is usually the computer operating system that detects the error or the computer operator cancels the execution of the software program because the program is not producing the correct results.

Upon a software error or failure, it is most common to capture the entire storage area used by the software program. However, because the error occurs before the program failure surfaces, the key data required to determine the cause of the error or failure is often lost or overlaid and it is not obvious how the path of execution got to the point where the error finally surfaced. Most program developers use a process called tracing to isolate a software error.

To use tracing, trace points must be placed within the problem program in order to sample data through the path of execution. The problem is recreated, if possible, and data from the trace points are collected. Unfortunately, tracing has some bad side effects including the following: 1) tracing requires a branch to a trace routine every time a trace point is encountered, often resulting in a significant impact to not only the problem program's performance but to other programs executing on the same system; 2) tracing requires large data sets to contain the volumes of data generated by trace points; 3) for the programmer that uses tracing to capture diagnostic data, he invariably finds himself sifting through the large amounts of data, the majority of which does not reflect on the cause of the error; 4) if the software problem was caused by a timing problem between two programs (e.g., two networking programs communicating with each other), the trace can slow the program execution down to the point where most timing problems cannot be recreated; 5) after the program problem is fixed, all the trace points must be removed and the program recompiled before it can be released commercially.

After all the data is collected, the cause of the program error is determined and the fix is generated and tested, another problem still faces software support personnel. If this problem occurs in another copy of the same software executing on another processor, how can it quickly be determined so resources aren't wasted trying to resolve problems that have already been resolved? This is another drawback of current methodology. When attempting to determine whether a software problem has already been discovered, reported, and/or fixed, software support personnel will rely on a problem description from the person that encountered the error or failure. However, different people will describe the same problem with different problem symptoms, making it difficult, it not impossible, to identify an already-known problem and match it up with the existing solution. A software programmer may spend several hours or days reviewing diagnostic data for a software problem only to find later that the software problem had been reported and resolved at an earlier time.

Typical of the prior art are U.S. Pat. Nos. 4,802,165, 3,551,659 and 3,937,938. U.S. Pat. No. 4,802,165 issued to Ream discloses a method and apparatus for debugging computer programs by using macro calls inserted in the program at various locations. The system records trace outputs from the program under test with the trace output being generated unconditionally, that is, whether or not an error has occurred. U.S. Pat. No. 3,551,659 issued to Forsythe discloses a method for debugging computer programs by testing the program at various test points and automatically recording error status information on an output device. Each chosen test point causes the invoking of an unconditional transfer to an error checking routine. U.S. Pat. No. 3,937,938 issued to Matthews discloses a method for assisting in the detection of errors and the debugging of programs by permanently storing in a memory structure the sixteen most recently executed program instructions upon the occurrence of a program malfunction.

In summary, the existing process for software error correction embraces a methodology which waits for the damage caused by a software error to surface. Then, data trace points are inserted, the problem is recreated, and the execution path of the problem program is followed while large amounts of data are collected, hopefully catching the data that will determine what went wrong.

SUMMARY OF THE INVENTION

It is an object of this invention to provide a method for detecting a software error immediately upon its occurrence and automatically collecting a limited amount of diagnostic data which will facilitate problem isolation and correction.

It is another object of this invention to provide a system for error detection that is enabled conditionally as a result of a software error in a problem program and that otherwise remains dormant.

It is a further object of this invention to provide a system for error detection that relies on the permanent placement of macro calls at error detection points within the software program rather than on temporarily inserted macro calls at selected trace points which are then removed after debugging is complete.

It is a still further object of this invention to automatically build a symptom string from the captured data which uniquely identifies the problem and to generate a generic alert to a network monitor.

It is a still further object of this invention to provide a system for error detection and isolation which minimizes the overhead related to debugging a program thus minimizing the impact on computer resources.

These and other objects and advantages are achieved by a process utilizing a methodology that calls for the conditional checking of software processing at strategic places within a program. When this logic detects an error, the process is called and collects only the data required to diagnose the error. This process is known as the Early Detection Data Capture (EDDC) process. It is a table-driven data collection and reporting routine which captures very specific program information, identified at the point of error detection. It builds a unique problem identifier, known as a software symptom string, and sends an automatic notification of the problem to an operator as is done, for example, using the IBM System Network Architecture generic alert function in a computer network utilizing this architecture.

The EDDC process provides a sophisticated data capture function and notification mechanism for software errors with minimal information required from the error detection code within the software problem program. The EDDC process provides this capability through the use of a predefined table that describes the layout and format of data structures and storage areas used by the problem program. When an error is detected, the call to the EDDC process includes basic information about the data that is not to be collected and the type of generic alert to be built for the notification.

The Early Detection Data Capture process uses permanently placed error detection points located strategically within a software program when initially developed. The detection points check the status of the software program throughout its execution. If an error is detected, the EDDC process is called. Unless an error is detected, the EDDC process remains completely inactive.

There are five major advantages of the Early Detection Data Capture process. First, error detection points are permanently placed within a software program during its development. No additional code (e.g., trace points) is required when the software program encounters an error. Second, the data required to diagnose the software error is captured the first time the error occurs with the new process and does not required problem recreation. Third, errors detected early can be stopped before permanent program damage can occur (e.g., database corruption, program code overlay) unlike the current process where an error detection occurs almost always too late. Fourth, less data is collected to diagnose the error resulting in smaller data dump listings, less data to store (less disk space), and less processing time by the computer to collect and output the data. Trace points, on the other hand, capture a significant amount of data. Fifth, early error detection increases the probability of successful error isolation, resulting in less chance of a complete software program failure. The end result is a software program with a higher availability rate.

BRIEF DESCRIPTION OF THE DRAWINGS

FIG. 2 is an illustration of a format of the application table header entry.

FIG. 3 is an illustration of the format of an application data structure entity entry.

FIG. 4 is an illustration of the format of the generic alert descriptor entry.

FIG. 5 is an illustration of the format of a generic alert causes entry.

FIG. 6 is an illustration of the format of a generic alert recommended action entry.

FIGS. 8A and 8B illustrate the format of the error log record generated by the Early Detection Data Capture process.

FIG. 9 is a table illustrating cross references between Application Data Table entry fields and the generic alert fields.

DETAILED DESCRIPTION OF THE PREFERRED EMBODIMENT

The EDDC process requires construction of a table which will be referred to as the Application Data Table (ADT). Its entries contain detailed information about the problem program and are selected by the error detection code as parameters on the call to the EDDC process. The EDDC process uses this table information to generate a dump of specific program storage areas, to create an entry in a software error log and to build a software generic alert. This table is the backbone of the EDDC process. It is a predefined table that provides the process with all the information required to provide useful and meaningful diagnostic data outputs.

Figure 1:
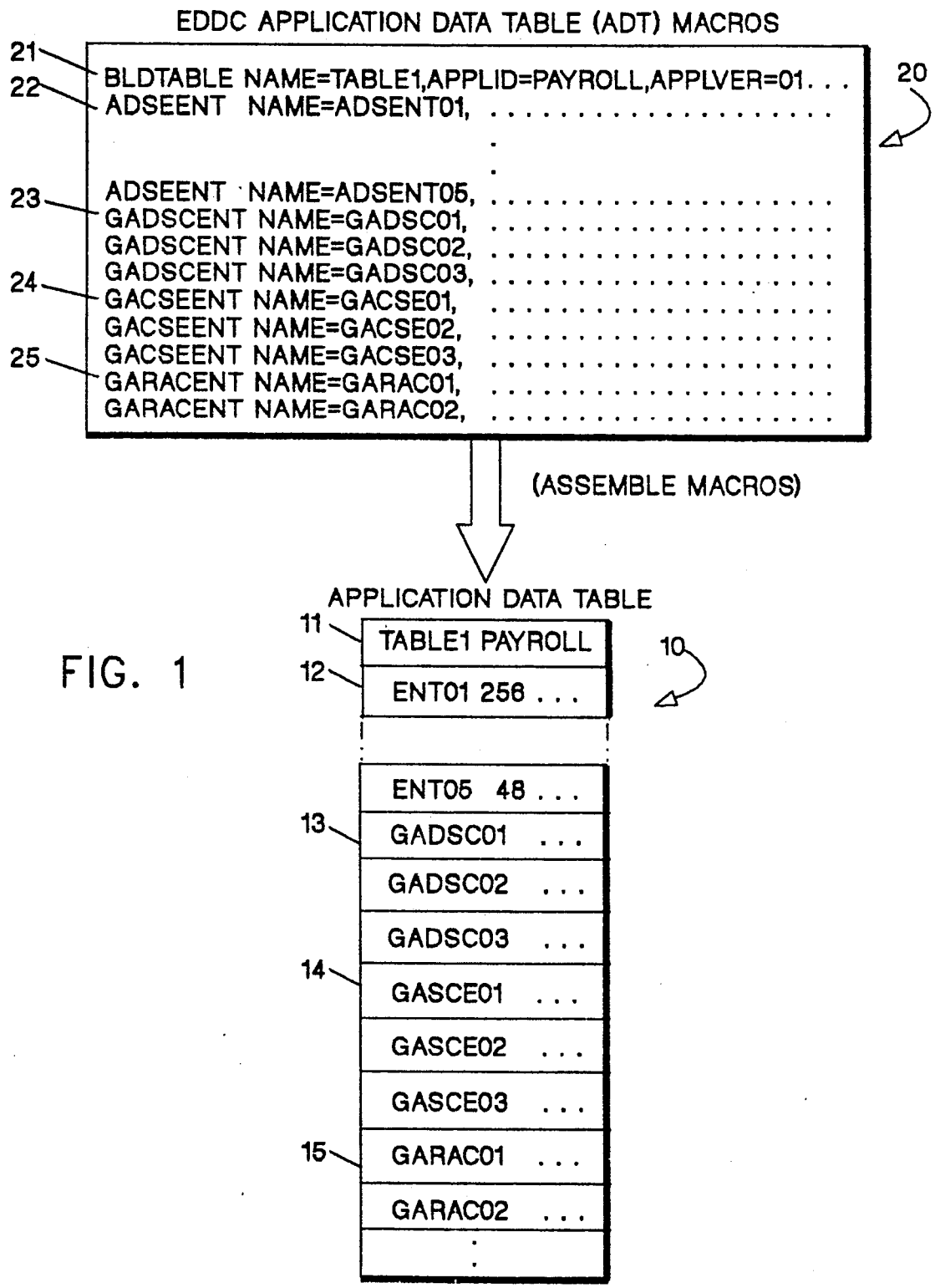
FIG. 1 is a diagrammatic representation illustrating the building of Application Data Tables.

With reference to FIG. 1, the table 10 is built using a set of software macros 20 which are fully described in the Appendix. Table entry information is selected by the error detection code and passed to the process via a macro call also described in the Appendix. This selection tells the process what is to be captured and the type of generic alert to be built. The ADT 10 contains one or more of the following entry types: an application data header, an application data structure entity, a generic alert descriptor, generic alert causes, and generic alert recommended action.

The application data header entry 11 contain global information about the problem program. Included is the name of the problem program and its version or release level. There is only one of these entries per table. It is included in the ADT via the BLDTABLE macro 21. The format and structure of this entry is shown in FIG. 2.

The application data structure entity table entry 12 explicitly describes the layout and format of a single data structure or control block used by a problem program. It includes information such as length and name of the data structure. It is included in the ADT via the coding of the ADSEENT macro 22. One or more of these entries are selected at the detection point, via the ADSEENTS keyword. The EDDC process uses this information to determine which areas of storage need to be captured. The structure of this table entry is shown in FIG. 3.

The generic alert descriptor table entry 13 contains information about the category of the error detected which is required by the generic alert. It is included in the ADT via the coding of the GADSCENT macro 23. Selected at the detection point via the ALERTDSC keyword, the EDDC process uses it to build the generic alert data and probable causes subvectors for the generic alert notification. The structure of this table entry is shown in FIG. 4.

The generic alert causes table entry 14 contains information about the cause of the error detected which is required by the generic alert. It is included in the ADT via the coding of the GACSEENT macro 24. One or more of these can be selected at the detection point via the ALERTCSE keyword. The EDDC process uses these to build the causes subvector (s) for the generic alert notification. The structure of the table entry is shown in FIG. 5.

The generic alert recommended actions table entry 15 contains information about the action required to resolve or fix the error. It is included in the ADT via the coding of the GARACENT macro 25. One or more of these can be selected by the detection point via the ALERTRAC keyword. The EDDC process uses it to build the recommended action subvector for the generic alert notification. The structure of this table entry is shown in FIG. 6.

Figure 7:
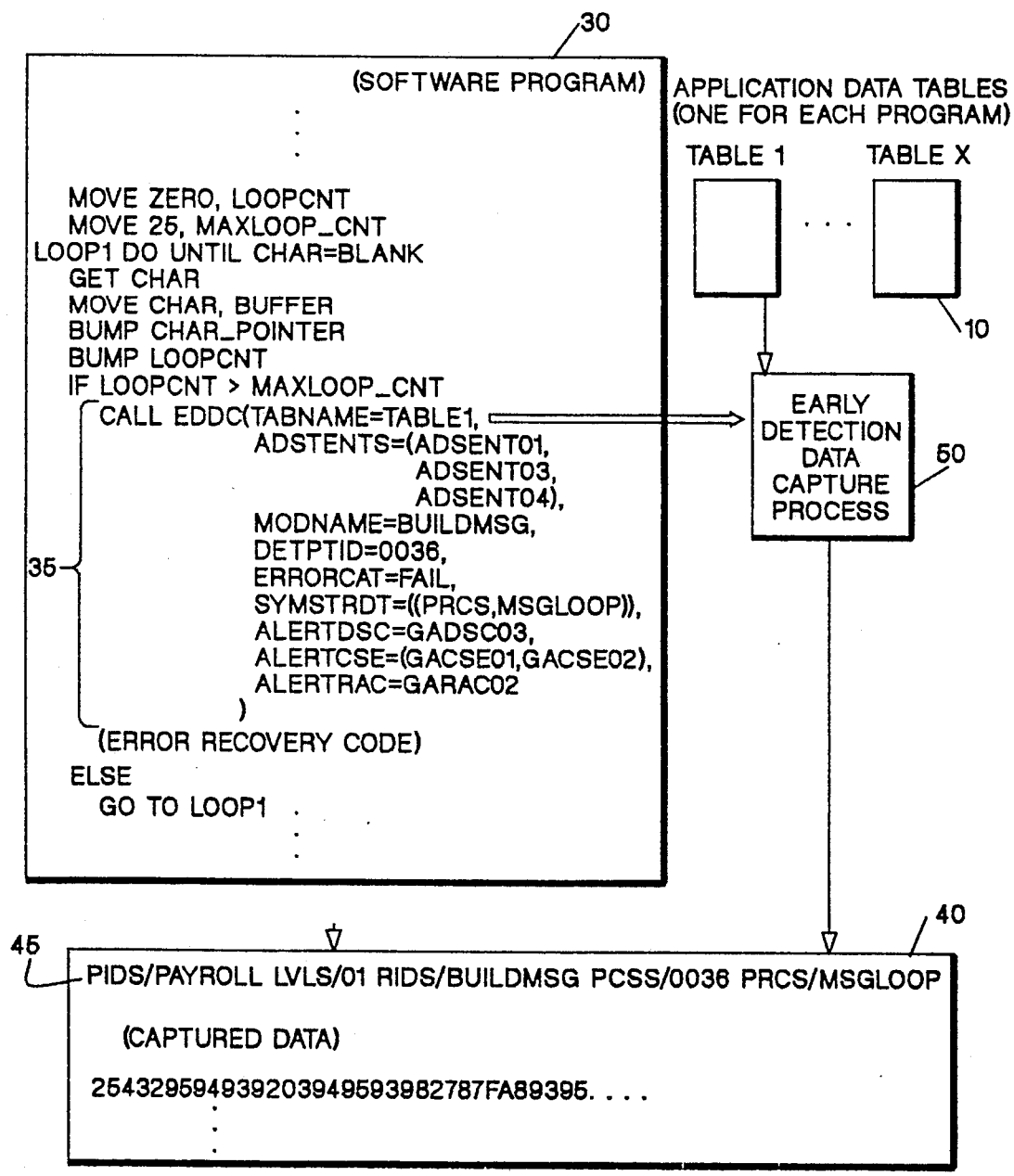
FIG. 7 is a diagrammatic representation of the Early Detection Data Capture process usage and operation.

The use of the EDDC process by a software program as illustrated in FIG. 7 requires two distinct operations. First, the software programmer describes the internal structure of the software program's storage usage using a set of EDDC software macros. These macros are coded as a separate job usually in parallel with the development of the software program. The output from these macros is a file that contains the Application Data Table (ADT) 10 whose entries describe the data structures (e.g., control blocks, data areas) used by the software program 30 and generic alert information required by the EDDC process 50. Second, the application programmer places error detection code 35 or alternatively, EDDC calls, at error detection points within a software program 30 during program development. These detection points 35 will detect the presence of a "should not occur" condition.

Examples of where detection points could be placed are: 1) In software code that implements a looping function, count the number of times a loop is executed and compare it to a maximum loop value. If it exceeds this value, the EDDC process is called. 2) Whenever a program calls another program for data, verify that the other program returned the type and value range of the data that was expected. If it did not, the EDDC process is called. 3) Whenever a program issues a request for data to another program, set a timer to the maximum time of wait allowed for the reply. If the timer expires before control has returned, the EDDC process is called. 4) If a software routine is called or requested to perform a service from another software routine (e.g., get storage, read a database) and the call was found to be in error (e.g., the function is not supported, invalid data in the call), then the EDDC process is called.

Whenever an error detection point is "tripped", the detection point calls the EDDC process and passes it the required information. When the EDDC process 50 is called, it performs the following operations: 1) The ADT 10 named in the EDDC call 35 via the TABNAME keyword, is brought into memory from disk. (The ADT is stored as a disk file after it is built.) 2) The application data structure entity entries 12 selected by the ADSEENTS keyword on the EDDC call 35, are located by the EDDC process 50. Program storage identified by each one of these named entries is collected and placed in a single program dump file 40. The name of the dump file is dynamically built using a sequence-naming convention, selectable by the user when a process is implemented. The EDDC process 50 will select the next name in the sequence automatically. The user selects a root name or prefix and a number, from 1 to up to the maximum number of dump files the EDDC process 50 will create, and it is appended to the root or prefix. For example, a root name could be APPLDMP and the maximum number of dump files that exist at any instance could be nine. The EDDC process 50 would put the first dump in APPLDMP1 and continue building dump data sets when called until APPLDMP9 was built. Thereafter, it checks to see if any previous dump data sets have been cleared. If not, the EDDC process 50 issues a message stating that no dump data sets are available and that no dump will be taken. 3) At the beginning of the dump file, a unique problem identifier known as a primary symptom string 45, is placed. It uniquely identifies the error for later identification. The symptom string is composed of a set of keyword-value pairs. The keyword identifies the meaning of the value associated with it. The format of the symptom string built by the EDDC process 50 is as follows: 'PIDS/xxxxxxxx LVLS/11111111 RIDS/rrrrrrrr PCSS/ssssssss (additional data)'.

The 'PIDS' keyword specifies that the associated value 'xxxxxxxx' contains the name of the problem program that detected the error condition. This value may be either a number or a name. It is taken from the application table header entry 11 in the Application Data Table 10.

The 'LVLS' keyword specifies that the associated value '11111111' contains the version or release level of the problem program that detected the error. This value is taken from the application table header entry 11 in the Application Data Table 10.

The 'RIDS' keyword specifies that the associated value 'rrrrrrrr' contains the name of the module or component that detected the error. This value is taken from the MODNAME keyword on the EDDC call 35.

The 'PCSS' keyword specifies that the associated value 'ssssssss' contains a unique detection point identifier. This value is received by the EDDC process 50 from the DETPTID keyword value passed on the EDDC call 35. The PCSS value is usually a sequence number that is unique within the module. Along with the module or component name from the MODNAME keyword on the EDDC call 35, this identifier will uniquely identify the detection point that detected the software error.

The '(additional data)' is data appended to the symptom string 45 by the EDDC process 50. It is received by the EDDC process 50 via the SYMSTRDT keyword on the EDDC process call 35. This is additional information the program developer can pass to the process to be included in the symptom string. Each symptom string entity has a format 'xxxx/vvvvvvvv' where 'xxxx' is a keyword that identifies the category of the associated value, 'vvvvvvvv'. The complete set of keywords used and supported by the EDDC process is contained in Table 1.

TABLE 1

Symptom String Keywords

'AB'—specifies that 'vvvvvvvv' contains an abnormal ending (ABEND) or program check code.

'ADRS'—specifies that 'vvvvvvvv' contains an address or offset associated with the error detected.

'DEVS'—specifies that 'vvvvvvvv' contains a value that identifies a device that is involved in a failure (e.g., device number, device address).

'FLDS'—specifies that 'vvvvvvvv' contains a field, data structure, or label name associated with the error detected.

'MS'—specifies that 'vvvvvvvv' contains a message number, issued by a program or device, that is associated with the error detected.

'OPCS'—specifies that 'vvvvvvvv' contains a process code (e.g., program operation code, command code, request code) associated with the error detected.

'OVS'—specifies that 'vvvvvvvv' contains the name of a storage area (e.g., control block, data area) whose storage was overlayed.

'PCSS'—specifies that 'vvvvvvvv' contains a statement name, command, or parameter associated with the error detected.

'PRCS'—specifies that 'vvvvvvvv' contains a return code, status code, condition code, or device code associated with the error detected.

'REGS'—specifies that 'vvvvvvvv' contains a register type associated with the error detected. The next 'VALU' keyword will represent the value contained by this register.

'RIDS'—specifies that 'vvvvvvvv' contains a module, macro, subroutine, function or procedure name associated with the failure detected.

'SIG'—specifies that 'vvvvvvvv' contains an operator warning signal identifier associated with the failure detected.

'VALU'—specifies that 'vvvvvvvv' contains the value of a register associated with the failure detected. This keyword is used in conjunction with the 'REGS' keyword.

'WS'—specifies that the 'vvvvvvvv' value contains a wait state code associated with the error detected.

After the data dump is completed, control is returned back to the caller of the EDDC process 50 in order to minimize the delay to the problem program 30. An error log data record is constructed according to the format illustrated in FIG. 8 and includes the following information: 1) An identification of the processor on which the problem program 30 that detected the error was executing. This includes the machine type and serial number. This information is accessed through the operating system services. 2) The date and time the EDDC process 50 was called. This information is accessed through the operating system services. 3) The name of the file that contains the storage dump 40. This is taken from the storage collection routine within the EDDC process 50. 4) An identification of the operating system on which the problem program 30 that detected the error was running. This information is accessed through the operating system services. 5) An identification of the problem program 30 that detected the error. This information is taken from the application data header entry 11 in the Application Data Table (ADT) 10. 6) The primary symptom string. 7) A secondary symptom string which is a collection of additional data required to further identify the error. All the registers and their values at the time of error detection should be included in the secondary symptom string. The error log record is placed on a software problem error log.

Figure 10:
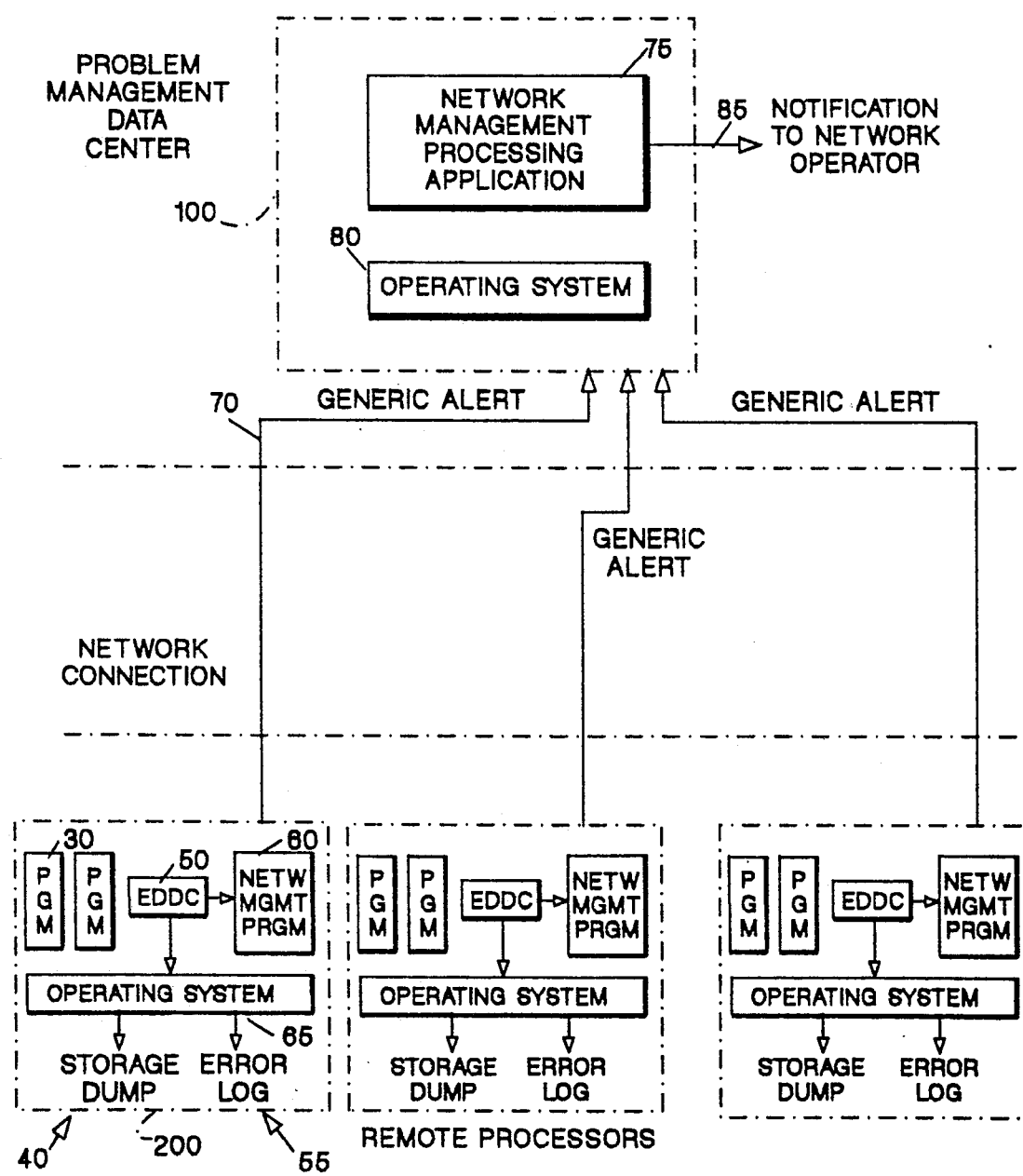
FIG. 10 is a diagrammatic representation of an implementation of the Early Detection Data Capture process in a computer network that supports generic alerts.

A generic alert is constructed next for software programs executing on a processor in a computer network that supports generic alerts as illustrated diagrammatically in FIG. 10. A number of steps have to be performed in order to construct the generic alert. In the first step, the generic alert data and probable causes subvectors are built from information in the generic alert descriptor entry 13 selected by the ALERTDSC keyword on the EDDC process cell 35 (FIG. 7). FIG. 9 illustrates a detailed mapping of the generic alert descriptor entry fields to the generic alert data and probable causes subvectors. In the second step, the generic alert causes subvector (s) is built from information in the generic alert causes entry (s) selected by the ALERTCSE keyword on the EDDC process call 35. FIG. 9 again illustrates this mapping. In the third step, the generic alert recommended action subvector is built from information in the generic alert recommended action entry (s) selected by the ALERTRAC keyword on the EDDC process call 35. FIG. 9 illustrates a detailed mapping of the generic alert recommended action entry fields to the generic alert recommended action subvector. The final three steps in the construction of the generic alert require information from the software problem error log record stored on error log 55. From the error log record, the date/time subvector, the product identification subvector and the correlation subvector are built. The correlation subvector includes the name of the file that contains the storage dump 40. Once the generic alert 70 is constructed, it is passed from the network management program 60 executing on remote processor 200 via operating system 65 to the network management application 75 for processing at the host processor 100. Host operating system 80 then passes the notification to the network operator 85. At this point, the EDDC process is terminated.

Although the preferred embodiment has been discussed with reference to the detection and diagnosis of software errors in a single program, the system and method of this invention is readily extended to handle multiple software programs concurrently. This is accomplished by implementing the EDDC process 50 as a common routine with multiple ADTs 10 as illustrated in FIG. 7. Each software program 30 will have at least one ADT 10 associated with it.

APPENDIX

I. Application Data Table (ADT) Macros

The macros used to build the ADT are BLDTABLE, ADSEENT, GADSCENT, GACSEENT and GARACENT. The formats of these macros are described in the following paragraphs.

BLDTABLE

The BLDTABLE macro is used to start the build ADT process. It is the first macro in the ADT built program and is present once for every ADT table built. Its output is the first entry, the Application Data Header entry, in the table. The format of this macro is as follows:

```
BLDTABLE NAME=TABLNAME,
         APPLID=pgmname,
         APPLVER=pgmversn,
         SVCLVL-svclevel
``` where:

'tablname' is the name given to this ADT; (This table is selected by this name through the TABNAME keyword value used on the EDDC call at the detection point.)

'pgmname' is the name of the program to which this data pertains;

'pgmversn' is the version or release level of the program;

'svclevel' is the level of corrective service already applied to the program.

ADSEENT

The ADSEENT macro is used to place an Application Data Structure Entity entry into the ADT. This macro builds a description of a data structure or control block used by the software program. One or more ADSEENT macros may be present, each having the following format:

```
ADSEENT NAME=entrname,
        DSLENADR=lenadrs
        DSNADRLN=nxadrlen,
        DSNXADRS=nextadrs,
        STPIDADR=stidadrs,
        STOPID=stpidval,
        DSIDADR=dsidadr,
        DSID=dsidval,
        DSTITLE=dstitle
``` where:

'entrname' is the name assigned to this entry;

'lenadrs' is an offset into the data structure where the length of the data structure is located;

'nextadrs' is the offset into this data structure where the address of the next data structure, chained off of this data structure, is located; (This keyword is only used if this data structure being described is a link in a series of chained data structures.

'stidadrs' is the offset into this data structure where the last-in-chain identifier is located; (This keyword is only used if this data structure being described is a link in a series of chained data structures. This identifier tells the EDDC process that this is the last data structure in a series of chained data structures.)

'stpidval' is the value that will be used for comparison when checking to see when a last in chain data structure is found while the EDDC process is dumping a chain of data structures;

'dsidadr' is the offset into this data structure where the data structure identifier is located; (This identifier value is compared to the identifier value assigned to the DSID keyword to assure the correct data structure was found.)

'dsidval' is the value to be used in the comparison to the data structure identifier found in this data structure, pointed to be the DSIDADR keyword;

'dstitle' is the title that will be put above this data structure when dumped.

GADSCENT

The GADSCENT macro is used to place a Generic Alert Descriptor entry into an ADT. This macro builds an entry that contains information required to build two of the Generic Alert subvectors, namely, the Generic Alert Data and the Probable Caused subvectors. One or more GADSCENT macros may be present, each having the following format:

```
GADSCENT NAME=entrname,
         CATGY=errcatgy,
         DESCCDPT=desccp,
         PROBCCPS=(probccp1,....,probccpx)
``` where:

'entrname' is the name assigned to this entry;

'errcatgy' is the category of the failure (e.g., permanent, temporary, unknown);

'desccp' is a two-byte hexadecimal code point that represents the overall error description;

'probccp1'—'probccpx' are one to five hexadecimal code points that identify the probable cause of the error.

Note: Code point is a term used by the Systems Network Architecture Generic Alert function. It represents a two-byte hexadecimal value that describes an aspect of the failure. Details of this information can be found in the IBM Systems Network Architecture Formats Manual, order number GA27-3136.

GACSEENT

The GACSEENT macro is used to place a Generic Alert Causes entry into an ADT. This macro builds an entry that contains information required to build the Generic Alert Causes subvectors. One or more GACSEENT macros may be present, each having the following format:

```
GACSEENT NAME=entrname,
         CAUSE=causecat,
         CAUSECP=causecp,
         CPTEXT=((texttype,text),....,(texttype,text))
``` where:

'entrname' is the name assigned to this entry;

'causecat' is the category of the cause (e.g., install error, user error, defect, unknown);

'causecp' is a two-byte hexadecimal code point that identifies the cause of the failure;

'texttype' is a one-byte value that identifies what the 'text' value represents (e.g., program check code, return code, error code);

'text' is the text data associated with the code point (see 'causecp')'

Note: Depending on the SNA Generic Alert causes code point selected, text data may be required as an inserted message into the text associated with the selected code point.

GARACENT

The GARACENT macro is used to place a Generic Alert Recommended Action entry into an ADT. This macro builds an entry that contains information required to build the Generic Alert Recommended Actions subfield. One or more GARACENT macros may be present, each having the following format:

```
GARACENT NAME=entrname,
         RECACTCT=racodept,
         CPTEXT=((texttype,text),....,(texttype,text))
``` where:

'entrname' is the name assigned to this entry;

'racodept' is a two-byte hexadecimal code point that identifies the action required to resolve the failure;

'texttype' is a one-byte value that identifies that the 'text' values represents (e.g., program check code, return code, error code);

'text' is the text data associated with the code point (see 'racodept' above).

Note: Depending on the SNA Generic Alert recommended action code point selected, text data may be required as an inserted message into the text associated with the selected code point.

II. EDC Application Program Interface

The EDDC process is accessed through a call and requires information that determines the data captured and the type of generic alert generated. The format of the call and a description of this information is documented below.

```
CALL EDDC  (TABLNAME=table_name,
            ADSTENTS=((entry1.address),....(entryx.address)),
            MODNAME=module_name,
            DETPTID=dpid,
            ERRORCAT=category,
            SYMSTRDT=((keyword.value),....(keyword.value)),
            ALERTDSC=alert_dscentnm,
            ALERTCSE=(alert_csentnm1,....alert csentnmx),
            ALERTRAC=(alert_raentnm1,....alert raentnmx).
``` where:

'table_name' is the name of the ADT to be used by the EDDC process;

'entry1' is the name of an Application Data Structure Entity entry that describes a data structure that needs to be captured and 'address' is the starting address within the problem program of the data structure; (Each 'entry_' must have an 'address'.)

'address' is the storage address within the problem program where the data structure is located;

'module_name' is the name of the module or component which detected the error (i.e., from where the detection point was "tripped");

'dpid' is a value that uniquely identifies the detection point within the module/component identified by the MODNAME keyword;

'category' is the classification of the error detected (e.g., loop, wait, incorrect data);

'keyword' is the symptom string keyword that describes the value 'value'; (Table 1 provides a list of support symptom string keywords and their meaning.)

'value' is the value associated with the symptom string identifier 'keyword';

'alert_dscentnm' is the name of the Generic Alert Descriptor entry in the ADT named by the TABNAME keyword that pertains to the error;

'alert_csentnm—' is the name of the Generic Alert Cause entry(s) in the ADT named by the TABNAME keyword that pertains to the error; (One or more of these names may be included.)

'alert_raentnm_' is the name of the Generic Alert Recommended Action entry(s) in the ADT named by the TABNAME keyword that pertains to the error. (One or more of these names may be included.)

While the invention has been particularly shown and described with reference to the preferred embodiment thereof, it will be understood by those skilled in the art that various changes in form and details may be made therein without departing from the spirit and scope of the invention.

Having thus described our invention, what we claim as new and desire to secure by Letters Patent is:

1. A method of detecting and diagnosing software errors in a computer software program executing on a computer processor system comprising the steps of:

defining the internal structure of the computer software program and recording said internal structure in at least one predefined table in a disk file;

placing error detection points within said computer software program which are activated individually by the occurrence of a software error to signal when diagnostic data is to be collected;

responsive to the receipt of a signal to collect diagnostic data generated by an activated error detection point, transferring control of said computer software program to a data collection and reporting routine;

collecting and storing diagnostic data based on a first set of keyword-value pairs passed by the activated error detection point on a macro call to said data collection and reporting routine, and the computer software program internal structure contained in said predefined table;

generating a unique software symptom string under control of the data collection and reporting routine; and recording said software symptom string in a software program error log.

2. The method of claim 1 further comprising the steps of constructing a software error generic alert and forwarding said software error generic alert to a network monitor.

3. The method of claim 2 wherein the step of defining the internal structure of the computer software program includes coding a set of predefined macros as a separate job in parallel with the coding of said computer software program to determine the diagnostic data to be collected and the type of software error generic alert to be built.

4. The method of claim 1 further including the step of returning control back to the computer software program after said diagnostic data is collected and continuing with computer software program execution.

5. The method of claim 1 wherein said software symptom string contains a second set of keyword-value pairs which uniquely describe and identify the software error.

6. The method of claim 5 wherein the software symptom string contains the computer software program name, the computer software program version and release level, the computer software program module that detected the error, and a unique error detection point identifier.

7. The method of claim 1 wherein said predefined table contains identifying information for the corresponding computer software program, the layout and format of each data structure and control block used by the said computer software program, the category of the software error, the cause of the software error detected, and the action required to resolve the software error.

8. The method of claim 1 wherein the step of placing error detection points within said computer software program includes locating macro calls to the data collection and reporting routine at points within said computer software program that can be reached only if a software error occurs.

9. The method of claim 1 wherein the step of collecting and storing diagnostic data includes loading said predefined table into memory from the disk file, and based on the first set of keyword-value pairs contained in the macro call to the data collection and reporting routine, collecting from computer software program storage the data identified by said first set of keyword-value pairs and writing said collected data to a dump file.

10. The method of claim 9 wherein the software problem error log contains an identification of the processor and operating system executing the computer software program, the date and time the data collection and reporting routine was invoked, the name of the dump file containing said collected data, an identification of the problem computer software program, and the unique software symptom string.

11. A system for detecting and diagnosing software errors in a computer software program executing on a computer processor system comprising:
table means for generating at least one predefined table that is representative of the internal structure of said computer software program and for saving said predefined table in a disk file;
error detection means located at error detection points within said computer software program for detecting the occurrence of a software error and for interrupting execution of said program; and
data collection and reporting means, cooperative with said error detection means and said table means for collecting data from memory that represents diagnostic data for the software error and for generating a software symptom string, said data collection and reporting means being actuated by the receipt of a macro call from said error detection means, said macro call identifying selected entries in said predefined table that contain the location in memory of said diagnostic data.

12. The system of claim 11 including means cooperative with said data collection and reporting means for constructing a software error generic alert based on said identified selected entries in said predefined table and forwarding said generic alert to a network monitor.

13. The system of claim 11 wherein said data collection and reporting means generates an error record for said software error and records said error record in an error log.

14. The system of claim 11 wherein said data collection and reporting means records said diagnostic data and software symptom string in a data file.

15. The system of claim 11 wherein said data collection and reporting means returns control to said computer software program after said diagnostic data is collected.

* * * * *